(12) United States Patent
Kraytsberg et al.

(10) Patent No.: US 11,318,418 B2
(45) Date of Patent: May 3, 2022

(54) APPARATUS AND PROCESS FOR SEPARATION OF WATER FROM DISSOLVED SOLUTES BY FORWARD OSMOSIS

(71) Applicant: Technion Research & Development Foundation Limited, Haifa (IL)

(72) Inventors: Alexander Kraytsberg, Yokneam (IL); Yair Ein-Eli, Haifa (IL)

(73) Assignee: Technion Research & Development Foundation Limited, Haifa (IL)

( * ) Notice: Subject to any disclaimer, the term of this patent is extended or adjusted under 35 U.S.C. 154(b) by 219 days.

(21) Appl. No.: 16/754,401

(22) PCT Filed: Oct. 24, 2018

(86) PCT No.: PCT/IL2018/051138
§ 371 (c)(1),
(2) Date: Apr. 8, 2020

(87) PCT Pub. No.: WO2019/082183
PCT Pub. Date: May 2, 2019

(65) Prior Publication Data
US 2020/0306695 A1    Oct. 1, 2020

Related U.S. Application Data

(60) Provisional application No. 62/576,669, filed on Oct. 25, 2017.

(51) Int. Cl.
*B01D 61/00* (2006.01)
*C02F 1/44* (2006.01)
*C02F 103/08* (2006.01)

(52) U.S. Cl.
CPC ............ *B01D 61/005* (2013.01); *C02F 1/445* (2013.01); *C02F 2103/08* (2013.01)

(58) Field of Classification Search
CPC ..... B01D 61/005; B01D 61/002; C02F 1/445; C02F 2103/08
See application file for complete search history.

(56) References Cited

U.S. PATENT DOCUMENTS

| | | | |
|---|---|---|---|
| 3,130,156 A | 4/1964 | Neff | |
| 9,266,069 B2 | 2/2016 | Higa et al. | |

(Continued)

FOREIGN PATENT DOCUMENTS

| | | |
|---|---|---|
| WO | WO 2010/043914 | 4/2010 |
| WO | WO 2017/045114 | 3/2017 |
| WO | WO 2019/082183 | 5/2019 |

OTHER PUBLICATIONS

International Preliminary Report on Patentability dated May 7, 2020 From the International Bureau of WIPO Re. Application No. PCT/IL2018/051138. (6 Pages).

(Continued)

*Primary Examiner* — Ana M Fortuna

(57) ABSTRACT

Provided herein is forward osmosis-based water purification process, that includes contacting a solution of a soluble draw agent with a dehydrated insoluble draw agent, separating the now hydrated insoluble draw agent from the now concentrated draw solution, and exerting a stimulus on the hydrated insoluble draw agent for extracting water therefrom, thereby regenerating a dehydrated insoluble draw agent, wherein the osmotic concentration (osmolality) of the insoluble draw agent is greater than the osmotic concentration of the diluted draw solution, and the insoluble draw agent is impermeable to the soluble draw agent.

24 Claims, 4 Drawing Sheets

(56) References Cited

U.S. PATENT DOCUMENTS

| | | | |
|---|---|---|---|
| 9,447,239 B2 | 9/2016 | Jung et al. | |
| 9,492,789 B2 | 11/2016 | Kim et al. | |
| 9,550,728 B2 | 1/2017 | Lee et al. | |
| 10,532,319 B2* | 1/2020 | Hu | B01D 61/005 |
| 2010/0155329 A1* | 6/2010 | Iyer | C02F 1/445 |
| | | | 210/636 |
| 2014/0217026 A1 | 8/2014 | Han et al. | |
| 2016/0074810 A1* | 3/2016 | Hu | C08F 220/54 |
| | | | 210/648 |
| 2016/0082391 A1 | 3/2016 | Hu et al. | |
| 2018/0008933 A1* | 1/2018 | Hu | B01D 61/005 |
| 2021/0323844 A1* | 10/2021 | Jessop | C08L 79/02 |

OTHER PUBLICATIONS

International Search Report and the Written Opinion dated Jan. 24, 2019 From the International Searching Authority Re. Application No. PCT/IL2018/051138. (10 Pages).

Cai et al. "Exploration of Using Thermally Responsive Polyionic Liquid Hydrogels as Fraw Agents in Forward Osmosis", RSC Advances, 5(118): 97143-97150, Nov. 11, 2015.

Cai et al. "Towards Temperature Driven Forward Osmosis Desalination Using Semi-IPN Hydrogels as Reversible Draw Agents", Water Research, 47(11): 3773-3781, Available Online Apr. 27, 2013.

Duan et al. "Evaluation of Sodium Lignin Sulfonate as Draw Solute in Forward Osmosis for Desert Restoration", Journal of Membrane Science, 453: 463-470, Available Online Nov. 26, 2013.

Fan et al. "Forward-Osmosis Desalination With Poly(Ionic Liquid) Hydrogels as Smart Draw Agents", Advanced Materials, 28(21): 4156-4161, Published Online Mar. 23, 2016.

Ge et al. "Exploration of Polyelectrolytes as Draw Solutes in Forward Osmosis Processes", Water Research, 46(4): 1318-1326, Available Online Dec. 27, 2011.

Gil et al. "Stimuli-Reponsive Polymers and Their Bioconjugates", Progress in Polymer Science, 29(12): 1173-1222, Available Online Sep. 25, 2004.

Hartanto et al. "Thermoresponsive Cationic Copolymer Microgels as High Performance Draw Agents in Forward Osmosis Desalination", Journal of Membrane Science, 518: 273-281, Available Online Jul. 16, 2016.

Li et al. "Assessment of Polyelectrolyte Draw Agents in Forward Osmosis Desalination", Chemeca 2011: Engineering A Better World, Sidney, Australia, Sep. 18-21, 2011, 10 P., Sep. 18, 2011.

Li et al. "Composite Polymer Hydrogels as Draw Agents in Forward Osmosis and Solar Dewatering", Soft Matter, 7(21): 10048-10056, Sep. 7, 2011.

Li et al. "Forward Osmosis Desalination Using Polymer Hydrogels as A Draw Agent: Influence of Draw Agent, Feed Solution and Membrane on Process Performance", Water Research, 47(1): 209-215, Published Online Oct. 3, 2012.

Luo et al. "Performance of Strong Ionic Hydrogels Based on 2-Acrylamido-2-Methylpropane Sulfonate as Draw Agents for Forward Osmosis", Journal of Environmental Engineering. 140(12): 04014044-1-04014044-8, Published Online Jul. 17, 2014.

Ou et al. "Microfiber-Polymer Hydrogel Monolith as Forward Osmosis Draw Agent", Journal of Membrane Science, 510: 426-436, Available Online Mar. 21, 2016.

Tian et al. "A Study of Poly Sodium 4-Styrenesulfonate) as Deaw Solute in Forward Osmosis", Desalination, 360: 130-137, Available Online Jan. 24, 2015.

Wang et al. "An Easily Recoverable Thermo-Sensitive Polyelectrolyte as Draw Agent for Forward Osmosis Process", Chinese Journal of Chemical Engineering, 24(1): 86-93, Available Online Nov. 14, 2015.

Wei et al. "Hydrogel-Polyurethane Interpenetrating Network Material as An Advanced Draw Agent for Forward Osmosis Process", Water Research, 96: 292-298, Available Online Apr. 1, 2016.

Zeng et al. "Significantly Enhanced Water Flux in Forward Osmosis Desalination With Polymer-Graphene Composite Hydrogels as A Draw Agent", RCS Advances, Electronic Supplementary Material (ES), 3(3): 887-894, Nov. 13, 2012.

Zhao et al. "Thermoresponsive Copolymer-Based Draw Solution for Seawater Desalination in A Combined Process of Forward Osmosis and Membrane Distillation", Desalination, 348: 26-32, Available Online Jun. 26, 2014.

\* cited by examiner

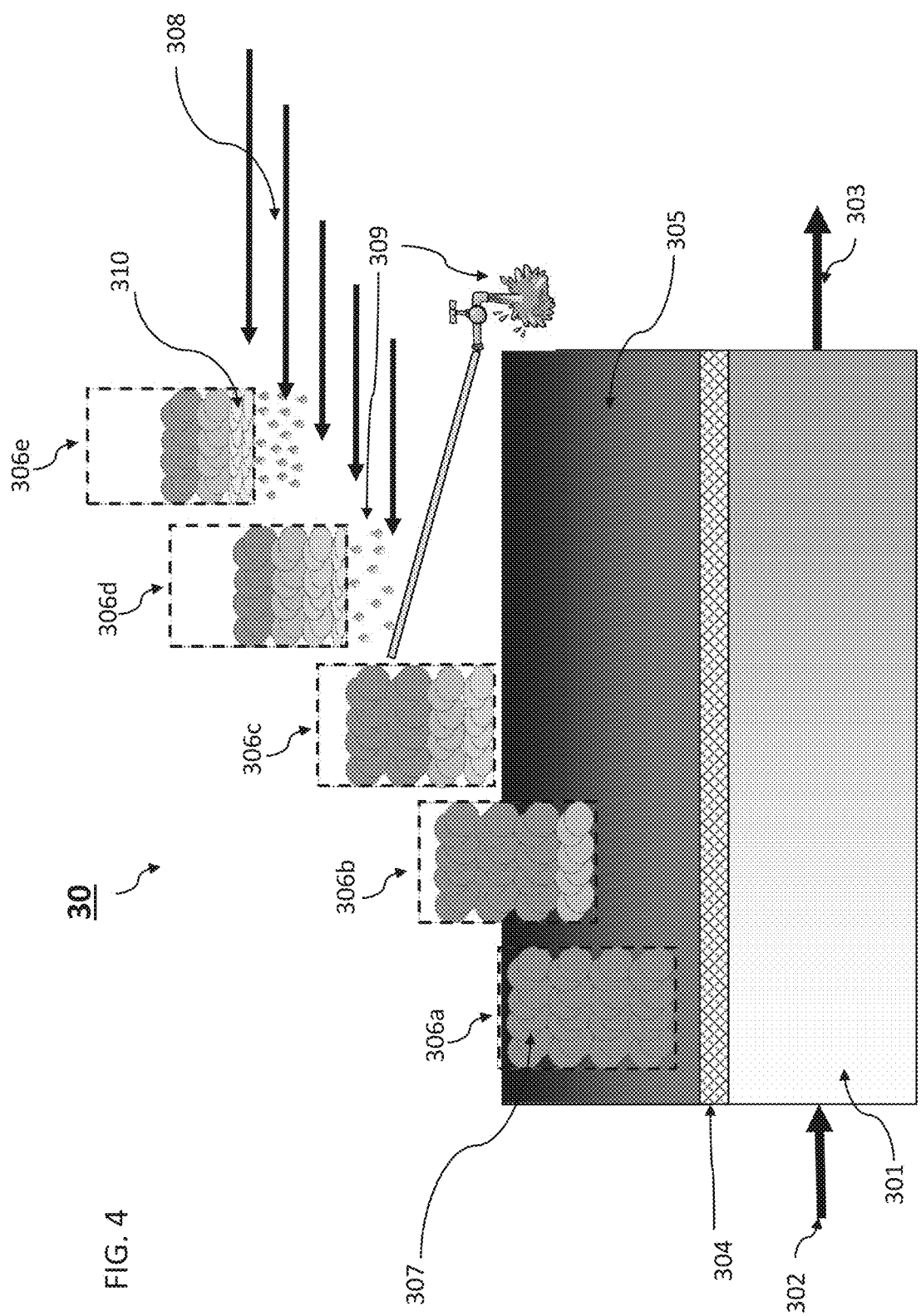

APPARATUS AND PROCESS FOR SEPARATION OF WATER FROM DISSOLVED SOLUTES BY FORWARD OSMOSIS

RELATED APPLICATIONS

This application is a National Phase of PCT Patent Application No. PCT/IL2018/051138 having International filing date of Oct. 24, 2018, which claims the benefit of priority under 35 USC § 119(e) of U.S. Provisional Patent Application No. 62/576,669 filed on Oct. 25, 2017. The contents of the above applications are all incorporated by reference as if fully set forth herein in their entirety.

FIELD AND BACKGROUND OF THE INVENTION

The present invention, in some embodiments thereof, relates to water treatment and desalination, and more particularly, but not exclusively, to apparatus and methods for separation of water from dissolved solutes by forward osmosis.

Fresh water shortage in many regions around the world is one of the major challenges of the $21^{st}$ century, with 1.2 billion people experiencing fresh water scarcity, and up to 66% of the world's population expecting to experience fresh water shortage by 2025 if current water consumption patterns persist. Whereas water is abundant in the most regions, the major part of it is seawater and saline brackish water, whereas accessible fresh water comprises less than 0.5% of the total water resource worldwide.

Seawater desalination has been recognized as one of the most practical solution to the global water shortage, and so far reverse osmosis (RO) is the leading technology for achieving seawater desalination. However, RO is a high energy-consuming process, requiring high-grade (expensive) energy sources to achieve the required high pressure that drives the process.

Forward osmosis (FO) is an emerging desalination technology, which is based on the exchange of the dissolved salts, which are difficult to remove from water (e.g. sea salt) for another solute (draw solute), which is more easily removable, followed by removing of this draw solute. This exchange of solutes is effected in a forward osmosis unit (FU) by placing the feed solution in contact with semipermeable membrane, which is permeable to water and impermeable to the dissolved salts. A concentrated draw solution comprising a draw solute is contacted with the other side of the membrane, wherein the draw solution is selected such that it exhibits a higher osmotic power, which drives the water to permeate through the membrane and dilute the concentrated draw solution. Hence, the FO process is based on water moving from a feed solution into a draw solution in the FU. To complete the FO process, a desalination plant further comprises a separation using (SU) or draw solution regeneration unit, in which water is separated from draw solution. Thereafter the concentrated (regenerated) draw solution is transferring back to the FO unit and fresh water is collected.

Hitherto, whereas the FU consumes very little energy, the SU consumes more energy per product unit than the equivalent produced in a RO plant, so operational cost savings are achievable mainly if SU is working using cheap low-grade energy sources.

Simple inorganic thermolytic salts are convenient draw agents having high osmotic pressure, being cheap and recyclable by low temperature heat (e.g., boiling away the ammonia and carbon dioxide and leaving fresh water). Nevertheless, it often requires implementation of elaborate equipment for complete removal of the salt and gases from the product (fresh water), which are decomposition products of such salts, and for the subsequent regeneration of these draw salts. Another problem in using thermolytic salts is that these draw solutes often exhibit high reverse flow, resulting in losses of draw solutes and contamination of the outgoing brine, creating additional environmental problems, as many thermolytic salts are detrimental to aquatic flora and fauna, and thus requiring a special and costly brine treatment stage.

Polyelectrolytes constitute a class of draw solutes that combine properties electrolytes (salts) and polymers (high molecular weight compounds), by exhibiting repeating pendant charged groups, forming polycations or polyanions charged polymers, along with low molecular weight counter-ions. Polyelectrolytes have been used as draw solutes combining high osmotic pressure with a favorably low reverse flow. Yet the implementation of polyelectrolyte-based draw solutions presents some challenges. One of these challenges is that SUs for such draw materials are usually based on nano-filtration (NF), micro-filtration (MF) or membrane distillation (MD); these methods are expensive techniques in terms of equipment and energy consumption.

A recent development is the introduction of thermally responsive polyelectrolyte draw solutes. The polymer backbones of such polyelectrolytes exhibit conformation transition that typically leads to a notable change in the hydration capacity of the polymer upon heating a certain critical temperature $T_c$, hence the term "low critical solution temperature", or LCST for short.

These polyelectrolytes change reversibly from being hydrophilic to being hydrophobic at their $T_c$ and also reversibly change conformation from coil to globules upon heating over their $T_c$; the transition results in change of their radius of hydration which is expressed in "squeezing out" intramolecular water molecules, which favorable for the polyelectrolyte draw molecules separation from fresh water in the SU. The biphasic hot draw solution is usually regenerated by MF, NF, MD or centrifugation processing. Hence, the application of LCST polyelectrolyte draw solutes still fails to overcome the energy consumption and design-related limitations.

The latest development in FO desalination is related to the use of LCST hydrogels. LCST hydrogels belong to a class of cross-linked polymers that absorb water by hydration of their polymer chains, and are capable of releasing the absorbed water upon heating over $T_c$. LCST hydrogels are neither hydrophilic nor hydrophobic, they combine both features being hydrophilic below $T_c$ and hydrophobic above $T_c$. LCST hydrogels exhibiting a water uptake (the ratio of the swelled hydrogel weight to the dry hydrogel weight) ranging 2-50 g/g, and exhibiting $T_c$ ranging 25-60° C., have been reported in the context of draw materials. The advantages of hydrogel draw materials include negligible reverse draw solute flux, response to waste industrial heat or cheap low-temperature solar heat, and relatively simple separation and regeneration process.

High water affinity LCST hydrogels, such as poly(N-isopropylacrylamide) (PNIPAm), and its copolymers, have been prepared and used as draw materials. Interpenetrating network-based LCST hydrogels with elevated water affinity have also been prepared by synthesizing hydrogels with one network conferring thermo-sensitivity and another polyelectrolyte-type network conferring elevated water affinity. These approaches hold promises for preparation of LCST hydrogels with the ability of considerably saline feed solution treatment. However, all these reported uses of LCST hydrogels-based FO technologies were designed to maintain direct contact of the gel draw material with the semipermeable membrane. In the most common design, the LCST hydrogel draw material is used in a powder form, wherein hydrogel particles are sized 2-1000 µm, and this powder is piled on a horizontally laid semipermeable membrane. Also, compacting of LCST hydrogel powder by presswork obtaining thick hydrogel compact bodies (up to 3 mm thick), as well as the preparation of a compact composite comprised of hydrogel particles (400 µm) incorporated inside polyurethane matrix, were reported.

The most pronounced drawback is the low water flux from the feed solution toward the draw material—the reported water flux was substantially lower compared with FO flow rates for FO units with the similar membranes and the same feed solutions but with liquid draw materials for all tested types of the draw gel materials. Two major factors are in charge of such situation. One factor, limiting water flux, is the small contact area of the membrane and the gel particles, which is much smaller than total membrane area. Another factor is related to the particularity of water transport in the bulk of the LCST hydrogel; the hydrated gel volume and volume of the gel with low water content behave as two separate phases having distinct interface, and as a result, water transport in the bulk of the hydrogel particle is the combination of water diffusion through the hydrated gel volume and the movement of the interface; the mechanism is responsible for low kinetics of water absorption by gel and hence low overall water flux. The solution is to decrease water path length by making the gel layer attached to the membrane enough thin; this essentially decreases draw material (gel) loading, though, which is very non-advantageous from the practical point. In addition, large variations of volume of LCST hydrogels make the industrially feasible design of the FO unit complicated and challenging.

SUMMARY OF THE INVENTION

Aspects and embodiments of the present invention are drawn to solutions to problems associated with water treatment and desalination using forward osmosis, and more particularly, to practical, efficient and economically effective solutions to known limitations in the separation step of the forward osmosis approach. Specifically, while the major drawback of forward osmosis is the difficulty in separating the water from the draw solution, embodiments of the present invention a family of solutions based on the use of particular hydrogels in a particular fashion, such that low-grade energy sources can be harnessed to drive the process.

According to an aspect of some embodiments of the present invention there is provided a process for water extraction, the process includes:

providing a solution that includes a soluble draw agent;
contacting the solution with a dehydrated insoluble draw agent thereby obtaining a hydrated insoluble draw agent in the solution;
separating the hydrated insoluble draw agent from the solution; and
exerting a stimulus on the hydrated insoluble draw agent thereby extracting water therefrom.

According to an aspect of some embodiments of the present invention there is provided a process for water purification, the process includes:

i) drawing water by osmosis through a semipermeable membrane from a feed solution of an undesired solute to a draw solution that includes a soluble draw agent at a first concentration of the soluble draw agent, thereby obtaining a solution that includes the soluble draw agent at a second concentration, the first concentration is greater than the second concentration;

ii) contacting the solution having the second concentration of the soluble draw agent with a dehydrated insoluble draw agent, thereby obtaining a hydrated insoluble draw agent in the solution and at least partially regenerating the solution having the first concentration of the soluble draw agent;

iii) separating the hydrated insoluble draw agent from the solution;

iv) exerting a stimulus on the hydrated insoluble draw agent thereby extracting water therefrom and regenerating the dehydrated insoluble draw agent.

According to some embodiments of the invention, the process for water purification further includes repeating steps i-iv.

According to some embodiments of the invention, the semipermeable membrane is impermeable to the undesired solute and to the soluble draw agent.

According to some embodiments of the invention, the osmotic pressure of the insoluble draw agent is greater than an osmotic pressure of the soluble draw agent.

According to some embodiments of the invention, the insoluble draw agent is substantially impermeable to the soluble draw agent.

According to some embodiments of the invention, the stimulus is selected from the group consisting of heat, compression, pressure, irradiation, electric field and magnetism.

According to some embodiments of the invention, the stimulus is heat, and the insoluble draw agent is a temperature-responsive hydrogel.

According to some embodiments of the invention, the temperature-responsive hydrogel includes a crosslinked temperature-responsive polymer, and is characterized by a critical solution temperature lower (LCST) than 100° C.

According to some embodiments of the invention, contacting includes soaking a dehydrated form of the temperature-responsive hydrogel with the solution of the soluble draw agent at a temperature below the LCST to thereby obtain a hydrated form of the temperature-responsive hydrogel.

According to some embodiments of the invention, exerting includes heating the hydrated form of the temperature-responsive hydrogel to a temperature above the LCST thereby extracting the water and regenerating the dehydrated form of the temperature-responsive hydrogel.

According to some embodiments of the invention, the stimulus is compression, and the insoluble draw agent is a pressure-sensitive hydrogel.

According to some embodiments of the invention, contacting includes dipping a dehydrated form of the pressure-sensitive hydrogel in the diluted draw solution, thereby obtaining a hydrated form of the pressure-sensitive hydrogel.

According to some embodiments of the invention, exerting includes compressing the hydrated form of the pressure-sensitive hydrogel, thereby extracting the water and regenerating the dehydrated form of the pressure-sensitive hydrogel.

According to some embodiments of the invention, the average cell/pore size of the crosslinked stimulus-responsive/sensitive polymer, e.g., the temperature-responsive polymer or the crosslinked pressure-sensitive polymer, is smaller than an average molecular size of the soluble draw agent.

According to some embodiments of the invention, the insoluble draw agent is in a form of a plurality of objects.

According to some embodiments of the invention, the objects have a shape selected from the group consisting of a globular particle, a particle cluster, a rod, a cylinder, a platelet, a tube, a sheet and a box.

According to some embodiments of the invention, the objects have an average size that ranges from 0.1 mm to 10 cm.

According to some embodiments of the invention, the insoluble draw agent is in a form of a monolithic object that can be engulfed by or soaked in the draw solution.

According to some embodiments of the invention, the total volume of the dehydrated insoluble draw agent or the hydrated draw agent is smaller than the total volume of the draw solution.

According to some embodiments of the invention, the insoluble draw agent is substantially not in direct contact with the semipermeable membrane.

According to some embodiments of the invention, the object has a shape selected from the group consisting of a sheet, an open-cell sponge and a tube.

According to some embodiments of the invention, the soluble draw agent is a water-soluble polyelectrolyte.

According to some embodiments of the invention, the average molecular weight of the polyelectrolyte ranges from 5,000 g/mol to 1,500,000 g/mol.

According to some embodiments of the invention, the polyelectrolyte molecule is selected from the group consisting of an anionic polyelectrolyte, a cationic polyelectrolyte, a nonionic polyelectrolyte, and any combination or copolymer thereof.

According to an aspect of some embodiments of the present invention there is provided a draw material set, which includes a soluble draw agent and an insoluble draw agent, wherein the draw material set is configured to draw water from a feed solution though a semipermeable membrane, the soluble draw agent is characterized by an osmotic pressure greater that the osmotic pressure of the feed solution, the osmotic pressure of the insoluble draw agent is greater than the osmotic pressure of the diluted solution of the soluble draw agent, the insoluble draw agent is impermeable to the soluble draw agent, and the insoluble draw agent is responsive or sensitive to a stimulus, such that when the insoluble draw agent is separated from the solution of the soluble draw agent (the draw solution) and exposed to the stimulus, water is extracted from the insoluble draw agent.

According to an aspect of some embodiments of the present invention there is provided an apparatus for water purification by forward osmosis, the apparatus includes:
a solution of a soluble draw agent (a draw solution);
an insoluble draw agent in contact with the draw solution;
a semipermeable membrane that allows water to pass therethrough (osmose) from a feed solution that includes an undesired solute, to the draw solution;
means for temporarily separating the insoluble draw agent from the draw solution; and
means for exposing the insoluble draw agent to a stimulus when separated from the draw solution,
wherein:
the soluble draw agent is having an osmotic pressure that is greater that the osmotic pressure of the feed solution;

the osmotic pressure of a dehydrated form of the insoluble draw agent is greater than the osmotic pressure of the (diluted) draw solution;
the insoluble draw agent is impermeable to the soluble draw agent; and
a hydrated form of the insoluble draw agent is responsive or sensitive to the stimulus, such that when the hydrated form is separated from the soluble draw agent and exposed to the stimulus, water is extracted therefrom.

According to some embodiments of the invention, the apparatus includes a forward osmosis unit (FU) and a separation unit (SU) in circular flow communication configured to circulate the solution of the soluble draw agent (the draw solution) therebetween, and the SU includes the insoluble draw agent and the means for temporarily separating the insoluble draw agent from the solution of the soluble draw agent.

According to some embodiments of the invention, the SU further includes the means for exposing the insoluble draw agent to the stimulus.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 4 presents a schematic illustration of an exemplary water desalination apparatus, wherein the FU and the SU are share a single fluid compartment.

DESCRIPTION OF SOME SPECIFIC EMBODIMENTS OF THE INVENTION

Figure 1:
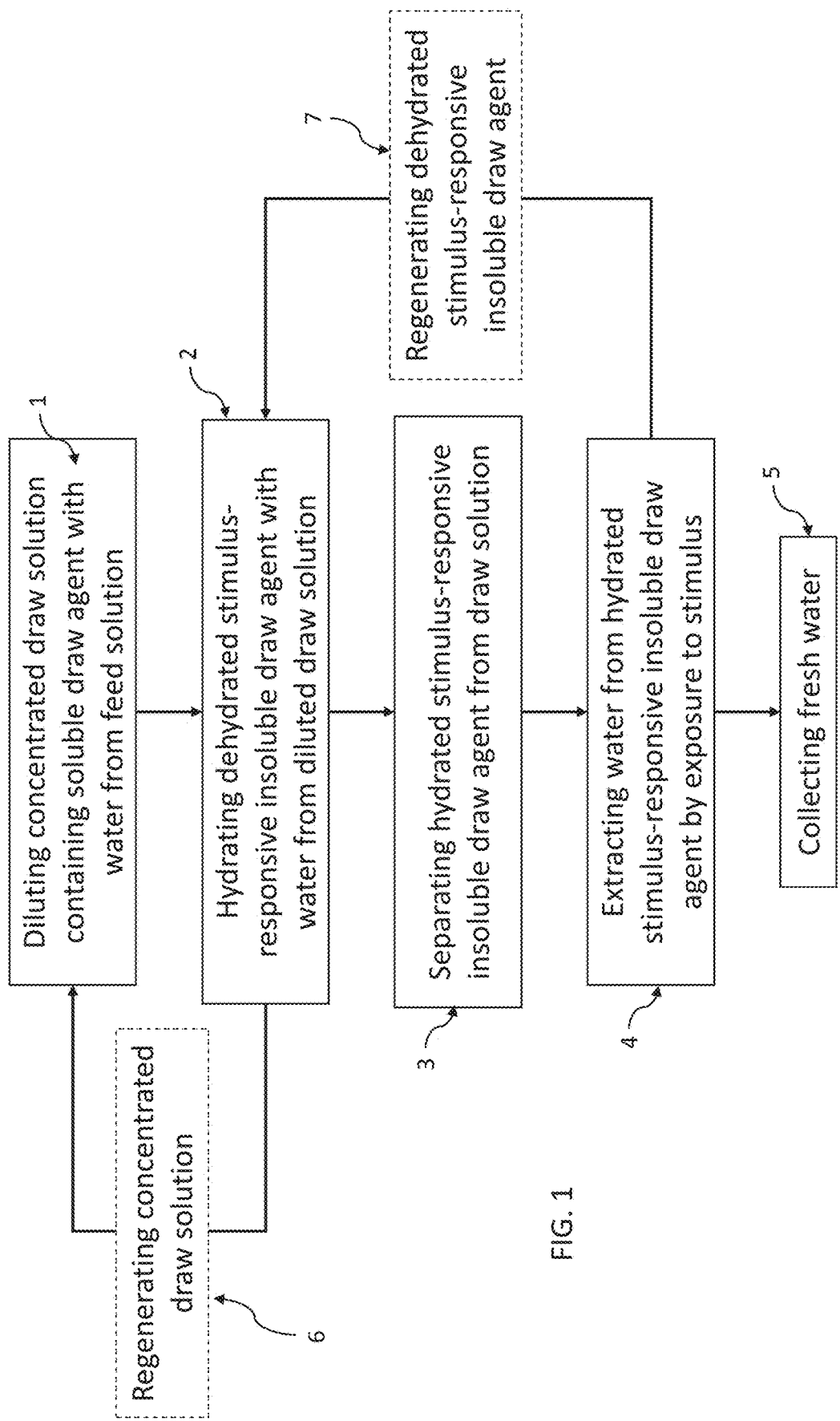
FIG. 1 is a flow chart illustrating an exemplary process for water purification that includes the process for water extraction, according to embodiments of the present invention

The present invention, in some embodiments thereof, relates to water treatment and desalination, and more particularly, but not exclusively, to apparatus and methods for separation of water from dissolved solutes by forward osmosis.

The principles and operation of the present invention may be better understood with reference to the figures and accompanying descriptions.

Before explaining at least one embodiment of the invention in detail, it is to be understood that the invention is not necessarily limited in its application to the details set forth in the following description or exemplified by the Examples. The invention is capable of other embodiments or of being practiced or carried out in various ways.

As presented hereinabove, current approaches for using forward osmosis for water treatment and desalination suffer primarily from efficiency issues, mostly due to water flux between the semipermeable membrane and the draw material, being particles of an LCST hydrogel. FO water flux through the semipermeable membrane depends on the membrane permeability and on the difference of the water affinity to the feed solution and to the draw material. The issue is that only part of osmotic pressure, which is governed by the difference of chemical potentials of water in the feed solution bulk and in the draw material bulk, is applied to the membrane. Actually, the effective draw power depends on the external concentration pressure (ECP) and the internal concentration pressure (ICP), whereas ECP doesn't depend on the nature and concentration of the draw material, ICP depends on these factors. In essence, ICP exists because water molecules are concentrating near the membrane upon passing therethrough, and thus the membrane is actually contacting with the draw material, which concentration is less than the concentration of the balk draw material. This assumes that liquid draw material ICP depends on draw solute diffusion in the way that the faster is the solute diffusion, the higher water flux is.

It was recognized by the inventors that in the case of hydrogel-based draw material, the groups having affinity to water are bounded with the hydrogel polymer chains and thus unmovable, and the draw material concentration is actually proportional to the degree of the polymer chain hydration. In this circumstance ICP is controlled by water mobility inside the hydrogel structure. Typically the mobility of simple inorganic salts, organic draw agents and polyelectrolyte solutions all are substantially larger than mobility of water in hydrogels, which suggests that ICP at the membrane/gel interface are substantially larger than ICP at the membrane/(liquid draw material) interface.

As further recognized by the inventors, water has to move inside the bulk of the hydrogel particle after passing through membrane, and that usually the mobility of hydrated hydrogel/dry hydrogel interface determines the overall water flux. This observation is in agreement with the fact that water mobility in hydrated hydrogels is substantially higher than water mobility in dry hydrogels.

In addition, it was recognized that (hydrogel) particle contact area makes a substantial impact onto the water transport; the comparison of the water flux for the piled up hydrogel powder and a bulk sheet of the same hydrogel demonstrates that the layer of piled up hydrogel powder suffered from insufficient area of particle-to-particle contacts. The assumption is supported by studies that demonstrated that materials comprised of smaller hydrogel particles having larger contact area with neighbors (per gram), exhibit higher water flux. The conclusion is also backed up by the reported increase of water flux with diminishing the thickness of the layer of hydrogel particles, which are piled up onto a membrane.

The present inventors have further recognized that the hydrogel/membrane contact area is an important parameter; expectably, the osmotic water flow increases if this contact area increases. If the hydrogel-based draw material is the piled up hydrogel powder (which is most common FO-unit design), only part of the total membrane area is contacting with hydrogel particles, and the corresponding effective membrane area is relatively small.

Thus, the present inventors have recognized the above problems of hydrogel-type draw material implementation, which originate from the fact that water molecules have to pass several solid-solid interfaces traveling from feed salty water to the fresh water collector in the course of desalination. Other problems concern the direct LCST hydrogel contacting with semipermeable membrane is that the temperature of the membrane has to be below $T_c$ of the LCST hydrogel and thus the FO processing temperature cannot be optimized. Yet another problem is that aspects concerning the hydrogel packing and hydrogel volume cycling preclude the employment of efficient and robust FO unit design.

While conceiving the present invention, the inventors have contemplated a FO desalination process that employs a combination of two draw agents, a water-soluble draw agent (e.g., polyelectrolyte dissolved in a draw solution) and an insoluble draw agent (e.g., a stimuli-sensitive/responsive hydrogel soaked in the draw solution); the combination is used as composite SU material. According to some embodiments of the present invention, the FO-based desalination process/plant comprises a membrane-containing FU with a liquid draw solution, and a SU with hydrogel particles soaked in the liquid draw solution. In some embodiments, the draw solutes are polyelectrolytes, which combine high osmolality with low reverse flow, whereas the large molecular size anions or cations of the polyelectrolytes plays a key role in the separation process. The SU comprises a plurality of adequately shaped bodies of a stimuli-responsive insoluble draw material, such as, for example, a plurality of LCST hydrogel bodies shaped as globular particles, flat sheets or any other shape that exhibits a large surface area and suitable for any particular design and embodiment of the present invention.

In some embodiments, the stimuli-responsive hydrogel is characterized by a chemical composition (osmotic pressure-conferring pendant groups) and a three dimensional structure (main-chain network) that allows it to swell with water when soaked in an aqueous solution (such as the draw solution), and at the same time maintain a size-exclusion filtering attribute. In general, the properties of a hydrogel's 3D network are governed by the type of polymer comprising the network, and the degree of crosslinking. These factors determine the cell or pore size of the hydrogel, through and into which solutes can diffuse into the bulk of the hydrogel or be filtered out based on the solute's molecular size. The cell/pore size of the hydrogel can be set to a certain size-exclusion cut-off ranging from tenths of nanometers up to tenth of microns; at this scale hydrogel looks like a continuous medium resembling a sponge with pores.

It has been contemplated that being immersed in the aqueous draw solution comprising a soluble polyelectrolyte, hydrogel bodies would undergo hydration according to their affinity to water, but the polyelectrolyte molecules would be excluded if their size is over the hydrogel's 3D net cell/pore size.

While reducing the invention to practice, the inventors have produced crosslinked LCST hydrogel bodies, which are impermeable to the macroscopic ions of a polyelectrolyte, and release the absorbed water upon heating to about 60° C., thereby demonstrated a workable water desalination process based thereon, as can be seen in the Examples section that follows below.

Water Treatment and Desalination Process and Apparatus:

The present invention is drawn, in some embodiments thereof, to a water extraction process that is based on a set of two draw agents, a soluble draw agent and an insoluble draw agent—the process includes:

providing a solution containing the soluble draw agent (hereinafter the diluted draw solution);

contacting the diluted draw solution a dehydrated form of the insoluble draw agent, allowing water to osmose from the diluted draw solution into the insoluble draw agent, thereby obtaining a hydrated insoluble draw agent, and thereby also concentrating the draw solution (hereinafter the concentrated draw solution);

separating the hydrated insoluble draw agent from the draw solution; and exerting/applying a stimulus on the hydrated insoluble draw agent thereby extracting water therefrom.

The present invention is also drawn, in some embodiments thereof, to a water treatment process and apparatus that includes a forward osmosis unit (FU) and a separation unit (SU), wherein the FU comprises a semipermeable membrane, which is in contact on its feed-side with a feed solution, and is in contact on its draw-side with a concentrated draw solution. In some embodiments, the FU and the SU form a unified unit, and in some embodiments the FU and the SU are separated into two or more units.

A process of water purification, according to some embodiments of the present invention, includes:

i) drawing water by osmosis through a semipermeable membrane from a feed solution containing an undesired solute (e.g., sea water containing salt), to a concentrated draw solution containing a soluble draw agent (draw solution having a first concentration with respect to the soluble draw agent), thereby obtaining a diluted draw solution (draw solution having a second concentration with respect to the soluble draw agent; the first concentration is greater than the second concentration);

ii) contacting the diluted draw solution with a dehydrated form of a stimulus-responsive insoluble draw agent, allowing water to osmose from the diluted draw solution into the insoluble draw agent, thereby obtaining a hydrated form of the insoluble draw agent, and at least partially regenerating the first concentration in the draw solution with respect to the soluble draw agent;

iii) separating the hydrated insoluble draw agent from the draw solution (and optionally washing the hydrated insoluble draw agent from residues of the draw solution);

iv) exerting the stimulus on the hydrated insoluble draw agent thereby extracting water therefrom, regenerating the dehydrated insoluble draw agent and collecting the extracted water.

It is noted herein that any reference to a concentration of any given solute, and particularly the soluble draw agent, is made with respect to the specified solute, while considering no other solute or non-solute in the solution. For example, the first concentration of a solution containing the soluble draw agent is referred to in the context of the soluble draw agent regardless if the insoluble draw agent is present in the solution or separated therefrom.

In the context of embodiments of the present invention, the term "semipermeable membrane" or SPM, is used herein as it is known in the art, and refers to a substance that when in contact with an aqueous solution on at least one side thereof, allows water molecules to pass therethrough, while solutes in the solution are excluded from permeating therethrough. Without being bound by any particular theory, it is noted that in the context of embodiment of the present invention, a SPM is used to transfer water molecules from the feed solution to the draw solution, while excluding the passage of ions and larger molecules. Large solutes may be filtered out from passage by size-exclusion, while ions are excluded due to the discontinuity of the ion-hydrating water bridges across the membrane; water molecules may pass though due to the continuity of the hydrate shell of the membrane scaffold which are non-hydrating and thus impermeable to ions.

The term "feed solution" refer to the solution which water is extracted from, and the term "draw solution" refer to the medium that interacts with the feed solution on opposite sides of the semipermeable membrane, and towards which water permeates. The osmotic pressure of the feed solution is smaller than the osmotic pressure of the draw solution, therefore water is driven by the chemical potential gradient from the feed solution to the draw solution. Alternatively, it can be said that the chemical potential of water in the feed solution is higher than the chemical potential of water in the draw solution. The semipermeable membrane is essentially impassible to solutes on both the feed solution and the draw solution.

Forward Osmosis Unit (FU):

In the context of embodiments of the present invention, the FU is generally a continuous flow device, having feed-side compartment for the feed solution and a draw-side compartment for the draw solution, an inlet and an outlet for each compartment for letting the respective solution in and out in a continuous manner, and an interface between the two compartment, comprising the semipermeable membrane that separates the two compartment while in contact with both solutions, each on each side thereof.

The general rules of FO, on which the FU is based, are applicable in the context of embodiments of the present invention, namely the osmotic concentration of the concentrated draw solution is greater than an osmotic concentration of the feed solution, such that water diffuse from the low osmotic concentration side to the high osmotic concentration side so as to dilute the concentrated draw solution. Since the semipermeable membrane is impermeable to solutes in the feed solution, impermeable to the draw agents in the draw solution, water permeates through the membrane, and the overall effect is the passage of water from the feed to the draw side, resulting in the concentration of the feed solution, and the dilution of the draw solution by the permeated water. This part of the process provides the diluted draw solution that comprises a soluble draw agent.

FU may take any generic design form as known in the art, such as the plate and frame module, the spiral wound module (jelly roll), the tubular module, the hollow fiber module and the likes. It is contemplated within the scope of the present invention that the FU is equipped and configured for FO operation, including flow tubing, valves and pumps, temperature and pressure control units, and chemical, physical and mechanical sensors and monitors that are used in maintaining FO conditions. It is further contemplated that the draw solution side of the FU is configured as a separation unit, as this element is described hereinbelow; such design is demonstrated, for example, in FIG. 4.

It is noted herein that in the context of the present invention, any form of FU is used as a source of a solution of a soluble draw agent that carries the permeated water from the feed solution, hence is referred to as a diluted draw solution, and the unit where a concentrated draw solution is turned into a diluted draw solution in a continuous water desalination/purification process.

Separation Unit (SU):

The SU is in direct communication with the FU in the sense that the FU supplies the SU with the diluted draw solution, and the SU regenerates the concentrated draw solution to drive the FO process. This communication can be in a continuous flow configuration or any other configuration, and each unit can be sub-divided into several sub-units that work in parallel or sequentially.

According to some embodiments of the present invention, the SU comprises at least one compartment in which the diluted draw solution, which includes a soluble draw agent (draw agent 1), is contacted with an insoluble draw agent (draw agent 2).

The term "draw agent", as used herein, refers to a substance that confers osmotic pressure (interchangeably osmotic concentration; osmotic power; osmotic potential; osmolality) to a solution, as these terms are known and used in the art. In the context of some embodiments of the present invention, a draw agent is recyclable after being placed into solution so as to allow economically feasible process without significant loss of draw agent and recovery energy.

The Soluble Draw Agent

In the context of embodiments of the present invention, the term "soluble draw agent", also referred to in the art as a draw solute, is a water-soluble substance that generates an aqueous solution that is characterized by an osmotic pressure that is high enough to draw water out of a feed solution through a semipermeable membrane and into the draw solution. According to some embodiments of the present invention, the soluble draw agent comprises macromolecules having a relatively large molecular size which minimizes its reverse flow and its ability to infiltrate the insoluble draw agent's bulk. In some embodiments, the average molecular weight of the soluble draw agent, which correlates to its size, ranges from 5,000 to 1,500,000 g/mol, or in the alternative, characterized by a molecular weight of at least 5,000 g/mol, 10,000 g/mol, 50,000 g/mol, 100,000 g/mol, 200,000 g/mol, 300,000 g/mol, 400,000 g/mol, 500,000 g/mol, 600,000 g/mol, 700,000 g/mol, 800,000 g/mol, 900,000 g/mol, 1,000,000 g/mol, or at least 1,500,000 g/mol and larger.

Non-limiting examples of soluble draw agents, suitable for use in the context of some embodiments of the present invention, include polyelectrolytes. Polyelectrolytes are polymers with dissociating groups in their repeat units Like ordinary electrolytes (acids, bases and salts), they dissociate in aqueous solutions (water) and bear one or more charges depending on the pH value. Thus, the properties of polyelectrolytes are similar to both electrolytes and polymers. The salts, i.e. the products of a polyacids (polyanions) with a monomeric base and vice versa are called polysalts. Like regular salts, their solutions are electrically conductive and like polymers, their viscosity strongly depends on the molecular weight, size and concentration. The type of dissociating groups in the polyelectrolyte determines its solubility in water and in other polar and hydrogen-bonding liquids (alcohols etc.). For example, sulfonated linear polystyrene readily dissolves in water whereas polystyrene itself is one of the most water-resistant polymers. Both natural and synthetic polyelectrolytes are manufactured on a large scale. Common natural polyelectrolytes are pectin (polygalacturonic acid), alginate (alginic acid), carboxymethyl cellulose and polypeptides. Examples of common synthetic polyelectrolytes are polyacrylic acid, polystyrene sulfonate and their salts. The most common pendant acid groups of polyelectrolytes are –COOH, —$SO_3H$, —$PO_3H_2$ and benzenesulfonate, and the most common basic group is —$NH_2$.

Commercial grade polyelectrolytes include polyelectrolytes (PAA's), available from Dow Chemical (Duramax, Tamol™, Romax™, Dowex), Rohm and Haas (Acusol™, Acumer™, BASF (Dispex®, Magnafloc®), and Arkema (Rheoslove™, Terrablend).

Useful polyelectrolytes in the context of embodiments of the present invention include polycationic polymers, polyanionic polymers or copolymers that include both polycationic segments and polyanionic segments.

Anionic polyelectrolytes usually include polymers with pendant carboxyl groups (—$CO_2^-$), sulfonic groups (-$SO_3^-$), phosphonics groups (—$PO_3^{2-}$), and their copolymers; e.g., polyelectrolytes such as poly (styrene sulfonic acid), poly (vinylbenzyltrimethyl ammonium chloride) and poly (4-vinyl pyridinum butyl) chloride can be used. Also useful are cellulose acetate, hydrogen phthalate, cellulose acetate N.N-diethylamminoacetate, poly(4-vinyl pyridine), poly(4-vinyl pyridinum butyl) chloride and poly (vinyl pyrrolidone). There can also be used polyvinyl alcohol or a mixture of polyvinyl methyl ether with a copolymer of vinyl methyl ether with maleic anhydride.

Exemplary negatively charged repeat polymeric units include styrenesulfonic acid, 2-acrylamido-2-methyl-1-propane sulfonic acid, sulfonated lignin, ethylenesulfonic acid, methacryloxyethylsulfonic acid, sulfonated ether ether ketone, phosphate. Additional exemplary negatively charged polyelectrolytes include polyelectrolytes comprising a sulfonate group (—$SO_3^-$), such as poly(styrenesulfonic acid) (PSS), poly(2-acrylamido-2-methyl-1-propane sulfonic acid) (PAMPS), sulfonated poly(ether ether ketone) (SPEEK), sulfonated lignin, poly(ethylenesulfonic acid), poly(methacryloxyethylsulfonic acid), their salts, and copolymers thereof. Cationic polyelectrolytes commonly contain (-[tri-R-ammonium]$^-$) groups (e. g. poly[[2-dimethylamino] ethyl methacrylate]methyl chloride) and/or (-[diallyl-di-R-ammonium]$^-$) groups (e.g. poly[diallyl dimethyl ammonium] chloride).

Exemplary positively charged (cationic) polymeric repeat units include diallyldimethylammonium, vinylbenzyltrimethylammonium, ionenes, acryloxyethyltrimethyl ammonium chloride, methacryloxy(2-hydroxy)propyltrimethyl ammonium, N-methylvinylpyridinium, other N-alkylvinyl pyridiniums, a N-aryl vinyl pyridinium, alkyl- or aryl imidazolium, sulfonium, or phosphonium. Preferred pH insensitive positively-charged polyelectrolytes comprising a quaternary ammonium group, such as poly (diallyldimethylammonium chloride) (PDADMA), poly (vinylbenzyltrimethylammonium) (PVBTA), ionenes, poly (acryloxyethyltrimethyl ammonium chloride), poly (methacryloxy(2-hydroxy)propyltrimethyl ammonium chloride), and copolymers thereof; polyelectrolytes comprising a pyridinium group such as poly(N-methylvinylpyridinium) (PMVP), other poly(N-alkylvinylpyridines), and copolymers thereof.

The Insoluble Draw Agent

In the context of embodiments of the present invention, an insoluble draw agent comprises solid macroscopic objects (bodies; particles) that interact with the aqueous medium they are immersed in by absorbing water therein by a process referred to as hydration or swelling, as these terms are known in the art. According to some embodiments of the present invention, the insoluble draw agent is having a size and/or shape, at least when in the hydrated form, which enables it to be separated and/or removed easily from the draw solution by such means as straining, filtering, sedimentation, centrifugation and the like. In some embodiments, the insoluble draw agent solid objects are sized and shaped in such way that increases their overall surface area. For example, as opposed to large objects, small discrete objects exhibit a higher surface area, which can be exposed to and come in contact with the draw solution, per a volume unit.

In some embodiments, the dehydrated insoluble draw agent is used in the form of particulate objects having an average particle size that ranges from 0.1 mm to 10 cm, or in the alternative, the dehydrated insoluble draw agent is used in the form of particles having an average particle size of at least 0.1 mm, or at least 0.5 mm, 1 mm, 2 mm, 3 mm, 4 mm, 5 mm, 10 mm, 20 mm, or at least 5 cm. Alternatively, the dehydrated insoluble draw agent is used in the form of flat supported or non-supported objects of thickness between 0.5 mm and 1 cm, or rods of diameter between 0.5 mm and 1 cm.

In the context of embodiments of the present invention, the insoluble draw agent is further characterized by being capable of developing an osmotic pressure at its dehydrated form that is larger than the osmotic pressure of the soluble draw agent in the diluted draw solution; thus, when the insoluble draw agent is in contact with the diluted draw solution, water will be absorbed by the dehydrated insoluble draw agent, as long as the osmotic pressure of the gradually concentrating draw solution is less than the osmotic pressure of the gradually hydrating insoluble draw agent.

As used herein in the context of the insoluble draw agent, the term "dehydrated" refer to a form or state of the insoluble draw agent at which it is essentially depleted from water, or swollen with water at a level below its maximal capacity of water absorption. Alternatively, the terms "dehydrated" and "hydrated" refer to relative states of water absorption of the insoluble draw agent, wherein at the dehydrated state the insoluble draw agent holds less water than in the hydrated state. Further alternatively, the insoluble draw agent draws water from the diluted draw solution at the dehydrated state, thereby it becomes swollen and reaches the hydrated state; water is further extracted from the insoluble draw agent when it is in the hydrated state.

The microstructure of the insoluble draw agent is such that the soluble draw agent cannot penetrate into the bulk of the insoluble draw agent. In other words, the insoluble draw agent is characterized by a molecular size exclusion that prevents the soluble draw agent from being absorbed therein. Specifically, the insoluble draw agent is a hydrogel that comprises crosslinked polymer strands having a 3D structure and pore/cell sizes such that polyelectrolytes molecules (soluble draw agent) are excluded from penetrating its core based on their molecular size relative to the 3D net pore/cell cutoff size.

The general methodology of obtaining a hydrogel having a desired pore/cell size in its 3D network would be known to a skilled artisan of the art. Briefly, a hydrogel of a particular pore/cell cutoff size is obtained by forming a series of hydrogels with varying crosslinking levels (different amount of crosslinking agent in each tested sample), and testing each of the samples for absorption of a given soluble draw agent into the sample's core during swelling of the hydrogel in a solution of the soluble draw agent. The sample which was capable of swelling while substantially not taking in the soluble draw agent is considered adequate for serving as an insoluble draw agent.

The combined characteristics of the insoluble draw agent, namely the greater osmotic pressure compared to that of the diluted draw solution (a greater osmotic pressure than the soluble draw agent), and the size exclusion property that restricts the penetration of the soluble draw agent therein, provides a water separation mechanism wherein water migrate from the diluted draw solution into the insoluble draw agent, leaving the soluble draw agent in the draw solution, thereby increasing the concentration of the draw solution, or regenerating it into the concentrated form thereof (regenerating a concentrated draw solution).

According to embodiments of the present invention, the insoluble draw agent is selected to exhibit responsiveness to an external stimulus, e.g., a physical, chemical or electrical stimulus, such that its capacity to absorb and hold water decreases reversibly upon exerting the stimulus. In one non-limiting example, the insoluble draw agent can be a temperature-responsive substance, and the physical stimulus can be heat, wherein the hydrated temperature-responsive insoluble draw agent expels water therefrom upon its heating.

Temperature-Responsive Insoluble Draw Agents:

As used herein, the term "temperature-responsive" refers to a substance the reversibly changes one or more of its properties upon exposure to a different temperature than a reference temperature. In the context of the resent invention, the property is water uptake (hydration; swelling) such that the temperature-responsive substance responds to the temperature change substantially reversibly, namely it can undergo multiple cycles of heating and cooling while undergo multiple cycles of water uptake capacity changes respectively. In some embodiments, the temperature-responsive substance responds to an increase in temperature by exhibiting a reversible decrease in its capacity to absorb water, and by exhibiting a reversible increase in its capacity to absorb water after a decrease in temperature.

In some embodiments of the present invention, the temperature-responsive substance is a thermo-responsive polymer that exhibit a drastic and discontinuous change of its water uptake capacity with temperature. In the context of some embodiments of the present invention, a thermos-responsive polymer displays a miscibility gap in its temperature-composition diagram. Depending on the miscibility or water-absorption gap that is found at high or low temperatures, an upper or lower critical solution temperature exists, abbreviated herein as UCST or LCST, respectively.

In the context of the present invention, the insoluble draw agent is a crosslinked thermo-responsive polymeric substance, which in the context of water, is a thermo-responsive hydrogel. The term "thermo-responsive hydrogel", as used herein, refers to a covalently crosslinked polymeric network, or gel, that is capable of binding water molecules and therefore swell with a considerable amount of water. Three-dimensional covalently crosslinked thermo-responsive polymer networks are practically insoluble in all solvents, including water. Thermo-responsive polymer gels show a discontinuous change of the degree of swelling with temperature. At the volume phase transition temperature (VPTT), which may corresponds with the UCST or the LCST, the degree of swelling changes drastically.

According to some embodiments of the present invention the physical stimulus that is exerted on the hydrated insoluble draw agent is heat, and the insoluble draw agent is a temperature-responsive hydrogel. The temperature-responsive hydrogel comprises a crosslinked network of temperature-responsive polymers, exhibiting LCST, i.e. undergoing the reversible phase transition from a highly hydrated phase to the low-hydrated phase at a low critical solution temperature LCST, and is further characterized by an LCST lower than 100° C., or lower that 95° C., 90° C., 85° C., 80° C., 75° C., 70° C., 65° C., 60° C., 55° C., 50° C., or lower than 45° C. Preferably the LCST is lower than 70° C.

According to some embodiments of the present invention, such LCST hydrogels belong to the group of the temperature-responsive hydrogel represented by formulae I-IV or their copolymers or mixtures thereof, wherein the wavy line represents a possible crosslinking bond, and each of $R_1$, $R_2$, $R_3$, $R_4$, $R_5$ and $R_6$ stand for H and/or alkyl, alkenyl, cycloalkyl, heterocyclic, aryl and heteroaryl groups:

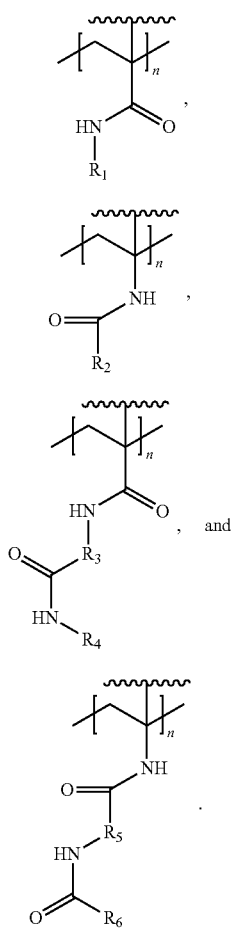

Formula I

Formula II

Formula III

Formula IV

As used herein, the term "alkyl" describes an aliphatic hydrocarbon including straight chain and branched chain groups. The alkyl group may exhibit 1 to 20 carbon atoms, and preferably 8-20 carbon atoms. Whenever a numerical range; e.g., "1-20", is stated herein, it implies that the group, in this case the alkyl group, may contain 1 carbon atom, 2 carbon atoms, 3 carbon atoms, etc., up to and including 20 carbon atoms. The alkyl can be substituted or unsubstituted, and/or branched or unbranched (linear). When substituted, the substituent can be, for example, an alkyl, an alkenyl, an alkynyl, a cycloalkyl, an aryl, a heteroaryl, a halo, a hydroxy, an alkoxy and a hydroxyalkyl as these terms are defined herein. The term "alkyl", as used herein, also encompasses saturated or unsaturated hydrocarbon, hence this term further encompasses alkenyl and alkynyl.

The term "alkenyl" describes an unsaturated alkyl, as defined herein, having at least two carbon atoms and at least one carbon-carbon double bond. The alkenyl may be branched or unbranched (linear), substituted or unsubstituted by one or more substituents, as described herein.

The term "alkynyl", as defined herein, is an unsaturated alkyl having at least two carbon atoms and at least one carbon-carbon triple bond. The alkynyl may be branched or unbranched (linear), and/or substituted or unsubstituted by one or more substituents, as described herein.

The terms "alicyclic" and "cycloalkyl", refer to an all-carbon monocyclic or fused ring (i.e., rings which share an adjacent pair of carbon atoms), branched or unbranched group containing 3 or more carbon atoms where one or more of the rings does not have a completely conjugated pi-electron system, and may further be substituted or unsubstituted. The cycloalkyl can be substituted or unsubstituted by one or more substituents, as described herein.

The term "aryl" describes an all-carbon aromatic monocyclic or fused-ring polycyclic (i.e., rings which share adjacent pairs of carbon atoms) groups having a completely conjugated pi-electron system. The aryl group may be substituted or unsubstituted. Substituted aryl may have one or more substituents as described for alkyl herein.

The term "heteroaryl" describes a monocyclic or fused ring (i.e., rings which share an adjacent pair of atoms) group having in the ring(s) one or more atoms, such as, for example, nitrogen, oxygen and sulfur and, in addition, having a completely conjugated pi-electron system. Representative examples of heteroaryls include, without limitation, furane, imidazole, indole, isoquinoline, oxazole, purine, pyrazole, pyridine, pyrimidine, pyrrole, quinoline, thiazole, thiophene, triazine, triazole and the like. The heteroaryl group may be substituted or unsubstituted as described for alkyl herein.

Compression-Sensitive Insoluble Draw Agents:

In some embodiments of the present invention, the insoluble draw agents are crosslinked 3D network of polymers, wherein their ability to absorb and hold water reversibly decreases upon exerting pressure thereon. Such dehydrated insoluble draw agents absorb water at the ambient pressure being dipped into aqueous solution and release the absorbed water being uniaxial pressurized (much like a sponge); this type of insoluble draw agent is referred to herein as a pressure-sensitive insoluble draw agents.

Without being bound to any particular theory, it is assumed that pressure-sensitive insoluble draw agents do not generally demonstrate a phase transition, but rather behave like a sponge, continuously changing the amount of absorbed water with the changing pressure. One can extract water from a pressure-sensitive insoluble draw agent by applying pressure or compression on the hydrated form to extract absorbed liquid therefrom; the higher extent of the compression, the more liquid is extracted.

A suitable pressure-sensitive insoluble draw agent substance, in the context of the present invention, is, for non-restrictive example, poly(potassium acrylate-co-acrylamide) with a molar ratio of 0.7/0.3, chemically crosslinked by N, N'-methylenebisacrylamide, coupled with high molecular weight soluble draw material so that sizes of its molecules are over the 3D net cell size of the said pressure-sensitive substance, and the substance is impermeable to the said soluble draw agent The materials and properties suitable for use in the context of the present invention would be readily understood by a skilled artisan of the art of polymers, as presented, for example, in Kim, S J. et al., *Nature Materials,* 2006, 5, 48-51, Vervoort, S. et al., *Polymer,* 2005, 46. 121-127, and U.S. Pat. No. 5,506,035.

Exemplary FO-Based Water Desalination Apparatus:

Some embodiments of the present invention can be described in the context of a forward osmosis apparatus that is based on the use of a set of mutually compatible and complimentary soluble and insoluble draw agents, as described hereinabove, referred to herein as a draw material set.

The process described herein can be implemented using any design and configuration that allows these basic steps as illustrated in FIG. 1.

FIG. 1 is a flow chart illustrating an exemplary process for water purification that includes the process for water extraction, according to embodiments of the present invention, wherein water osmose from a feed solution to a draw solution as in a general forward osmosis stage, while diluting the soluble draw agent in the draw solution (Box 1); water osmose from the diluted draw solution to the initially-dehydrated insoluble draw agent, thereby the insoluble draw agent becomes hydrated (Box 2) and the draw solution is re-concentrated (Box 6); the now hydrated insoluble draw agent is separated from the now concentrated draw solution (Box 3); a stimulus causes the separated and hydrated insoluble draw agent to shed the water therein (Box 4), thereby regenerating the dehydrated insoluble draw agent (Box 7); water is collected from the water extraction process as a product of the FO water purification process (Box 5).

The process can be effected continuously by reusing the concentrated draw solution containing the soluble draw agent to draw more water from the feed solution, and by reusing the dehydrated insoluble draw agent to draw more water from the diluted draw solution.

One exemplary FO-based water desalination apparatus comprises a membrane-containing forward osmosis unit (FU) with a liquid draw solution and a separation unit (SU) that includes an insoluble draw agent, preferably in the form of an LCST-hydrogel or another type of stimulus-responsive/sensitive hydrogel. Soluble draw agents of choice are polyelectrolytes since they combine high osmolality with low reverse flow; also, a large size of the anions (or cations) of the polyelectrolytes plays a role in the separation process.

The insoluble draw agent is a hydrogel that comprise a 3D network of crosslinked stimulus-responsive polymer chains, wherein the network is crosslinking to exhibit a particular pore/cell size that is smaller than the molecular size of the polyelectrolytes. Being immersed in the aqueous polyelectrolyte draw solution, the hydrogel undergoes hydration according to its affinity to water, but the polyelectrolyte molecules are excluded due to their size.

A forward osmosis water desalination/purification apparatus, according to some embodiments of the present invention, is based on a draw material set, as defined herein, and comprises any sort of a FU. The FU is preferably in circular flow with the SU, such that a continuous withdrawal of water from the feed solution can take place while regenerating the draw solution without significant waste of the soluble draw agent polyelectrolyte, however, other configurations are contemplated.

Other than comprising the insoluble draw agent, the SU preferably comprises means to separate the insoluble draw agent from the draw solution, namely from the soluble draw agent solution. These means can be any form of physical/mechanical element for straining solid objects from a liquid. The SU also comprises means to expose the strained and hydrated insoluble draw agent objects to a stimulus which causes the insoluble draw agent to lose at least some of its capacity to absorb water (also referred to herein as draining). In some configurations, soaking, straining and draining of the insoluble draw agent objects can be effected in one chamber; in some configurations soaking and straining are effected in one chamber, and draining in another chamber, whereas the term separation unit encompasses all such configurations regardless of the number of chambers and elements therein.

Figure 2:
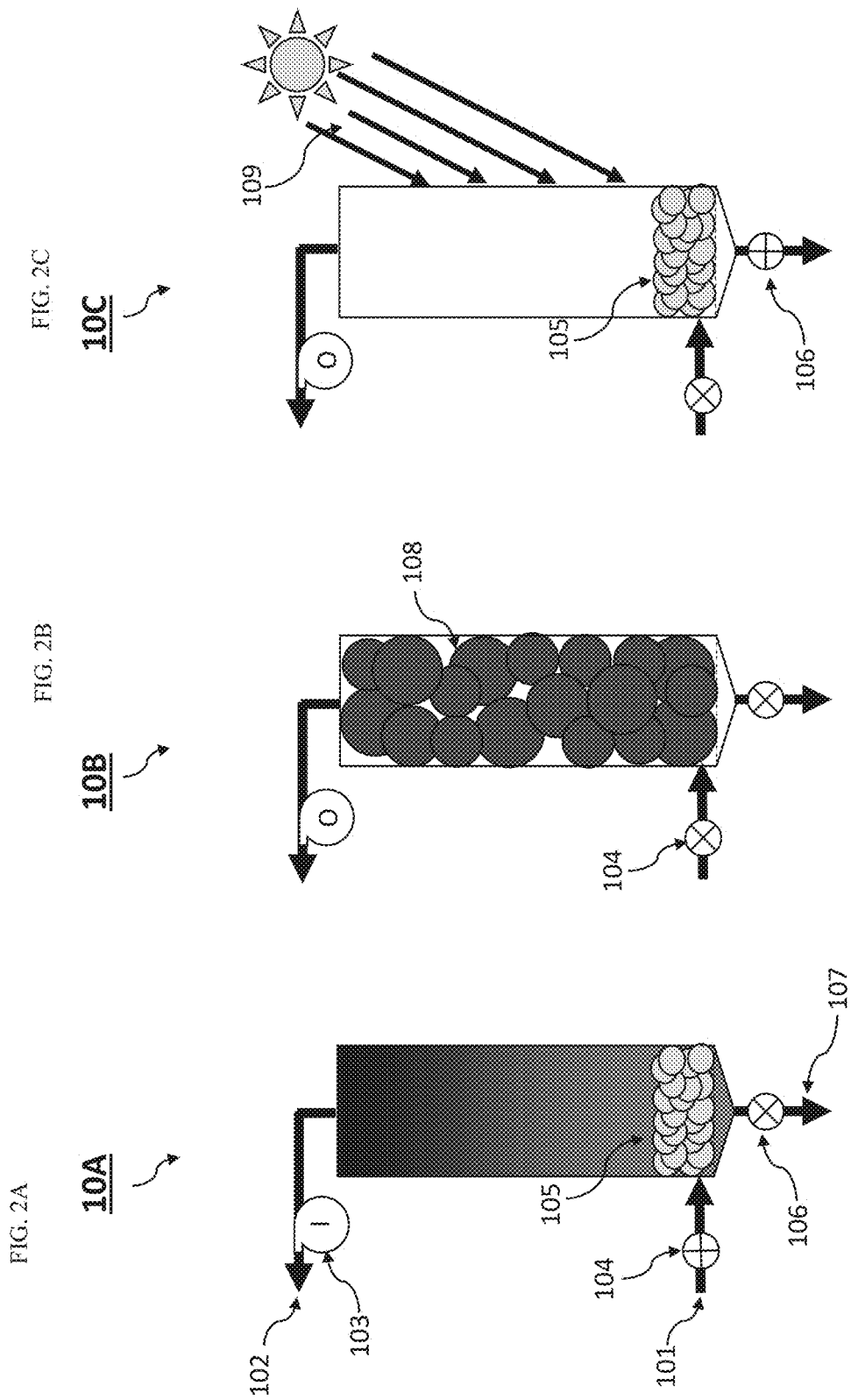
FIGS. 2A-C present a schematic illustration of three stages in a cycle of operation of an exemplary water desalination apparatus, according to some embodiments.

FIGS. 2A-C present a schematic illustration of three stages in a cycle of operation of an exemplary water desalination apparatus, according to some embodiments, wherein separation unit 10A-C, each representing a difference stage, is in circular flow communication with a forward osmosis unit (not shown) via inlet 101 that fills a chamber in the SU with a diluted draw solution from the forward osmosis unit, and via outlet 102 that circulates the concentrated draw solution back to the forward osmosis unit, driven by pump 103 and controlled by valve 104, and further comprising drainage valve 106 controlling desalinated water outlet 107; whereas separation unit 10A contains dehydrated insoluble draw agent 105, while valve 104 and pump 103 are on to expose and hydrate insoluble draw agent 105 with water from the diluted draw solution; separation unit 10B contains hydrated (swollen) insoluble draw agent 108, while valve 104 and valve 106 are off and the draw solution is removed from the chamber; and separation unit 10C contains dehydrated insoluble draw agent 105 after exposure to heat (external stimulus) 109 and draining the desalinated water via drainage valve 106.

It is noted that more than one SU can be in flow communication with a single FU, such that at any given time at least one SU is either drained, filled or exposed to the external stimulus.

Figure 3:
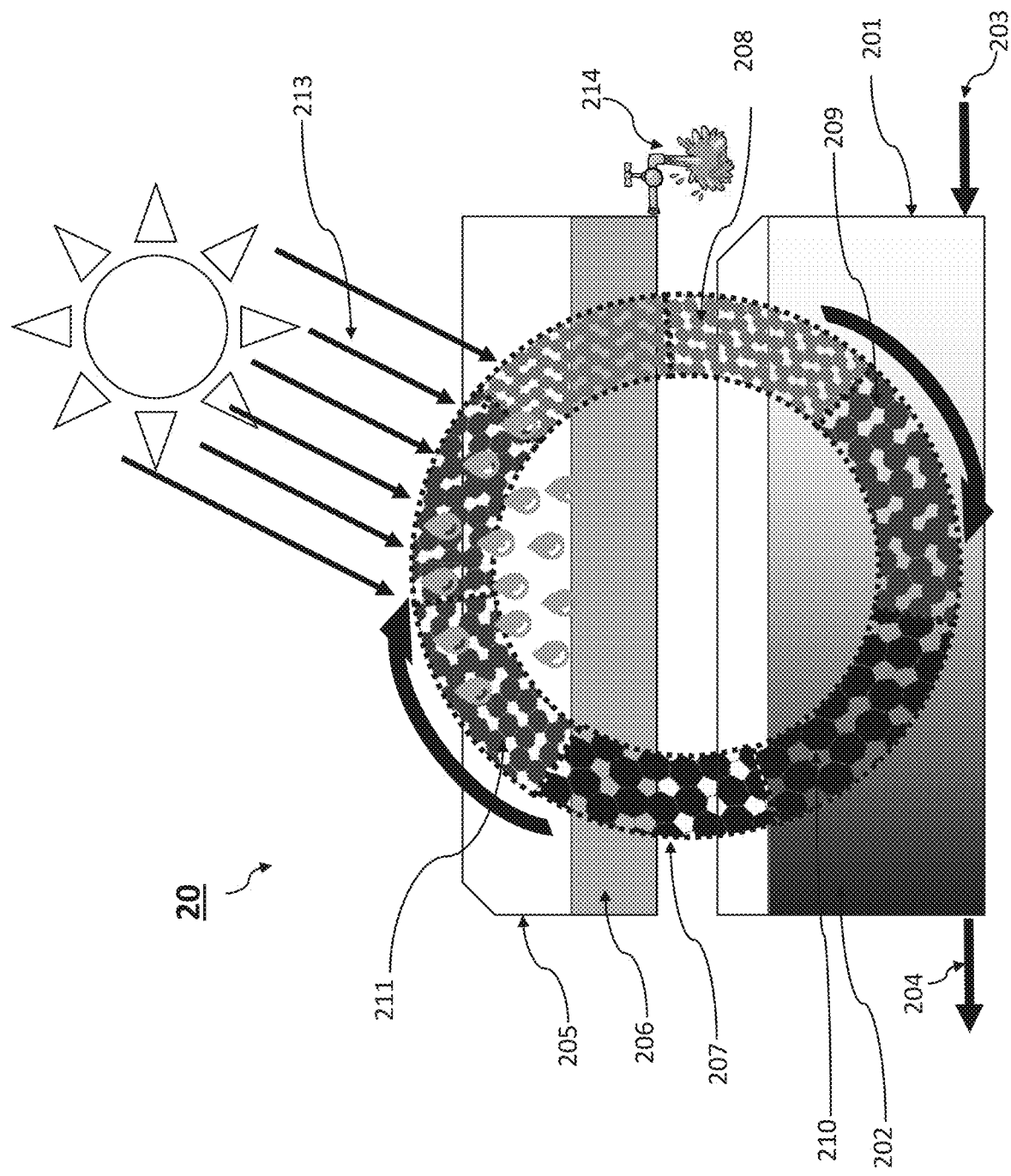
FIG. 3 presents a schematic illustration of an exemplary continuous operation water desalination apparatus, according to some embodiments of the present invention.

FIG. 3 presents a schematic illustration of an exemplary continuous operation water desalination apparatus, according to some embodiments of the present invention, wherein separation unit 20 comprises three elements, soaking chamber 201 filled with draw solution 202 which is flown in from a forward osmosis unit (FU; not show) via inlet 203 and back into FU via outlet 204, water collection chamber 205 where desalinated water 206 is collected, and rotating strainer 207, whereas rotating strainer 207 contains insoluble draw agent at various hydration states from dehydrated form 208, partially hydrated form 209, fully hydrated form 210, and partly dehydrated form 211, while heat (external stimulus) causes the dehydration thereof, allowing desalinated water 206 to be collected and tapped via product outlet 214.

It is noted that the rotating element is presented as an example only, and that other means of soaking, draining and heating of the insoluble draw agent are contemplated, such as separate compartments set in repetitive motion of dipping in and drawing out of the draw solution, and the likes.

As mentioned above, the FU and the SU can also be designed to exist in a single unit, as illustrated in FIG. 4.

FIG. 4 presents a schematic illustration of an exemplary water desalination apparatus, according to some embodiments of the present invention, showing forward osmosis unit 30 that includes feed solution compartment 301, having inlet 302 and outlet 303 for replenishing the apparatus with feed solution, semipermeable membrane 304 that let water osmose from feed solution compartment 301 to draw solution compartment 305, and further showing straining container 306a-c containing insoluble draw agent, which allows the separation of hydrated insoluble draw agent 307 from draw solution compartment 305, and the exposure thereof to stimulus 308, thereby extracting water 309 and generating hydrated insoluble draw agent 310.

It is noted that the illustration presented in FIG. 4 is not limited to a particular stimulus, which can be any one of heat, pressure, electrical field, magnetism, light/radiation and the likes, upon exposure to which the stimulus-responsive/sensitive insoluble draw agent releases the water absorbed therein. It is also noted that straining container 306a-c presented in FIG. 4 can be a single element at various stages, or a group of similar elements, each in a different stage of the process.

In order to maintain an effective and efficient water extraction process, it is preferred that the insoluble draw agent is completely engulfed by, or immersed in the draw solution during the contacting (water absorption; swelling; hydration) stage. It is also preferred that the surface area of the insoluble draw agent that is in contact with the draw solution is large; in some embodiments the surface area of the insoluble draw agent that comes in contact with the draw solution is larger than the surface area of the semipermeable membrane.

In some embodiments the surface area of the semipermeable membrane that comes in contact with the draw solution is larger than the surface area of the insoluble draw agent. In some embodiments it is advantageous that the total volume of the insoluble draw agent, dehydrated or hydrated, is smaller than the total volume of the draw solution; in some preferred embodiments it is advantageous that the total volume of the insoluble draw agent, dehydrated or hydrated, is larger than the total volume of the draw solution.

According to some embodiments of the invention, the insoluble draw agent is not in direct contact with the semipermeable membrane; in some embodiments, the insoluble draw agent is in partial, or inadvertent, or negligible contact with the semipermeable membrane, as such contact is not necessary for the process's effectiveness.

The apparatus can be further equipped with a stimulus generator, such as a heat-transfer unit that can exert heat from an external source of the heat to the separated and hydrated insoluble draw agent. In some embodiments a heat source can be part of the apparatus, such as a sunlight focusing device.

It is expected that during the life of a patent maturing from this application many relevant methods for inkjet printing of wash-fast images will be developed and the scope of the term "methods for inkjet printing of wash-fast images" is intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the phrases "substantially devoid of" and/or "essentially devoid of" in the context of a certain substance, refer to a composition that is totally devoid of this substance or includes less than about 5, 1, 0.5 or 0.1 percent of the substance by total weight or volume of the composition. Alternatively, the phrases "substantially devoid of" and/or "essentially devoid of" in the context of a process, a method, a property or a characteristic, refer to a process, a composition, a structure or an article that is totally devoid of a certain process/method step, or a certain property or a certain characteristic, or a process/method wherein the certain process/method step is effected at less than about 5, 1, 0.5 or 0.1 percent compared to a given standard process/method, or property or a characteristic characterized by less than about 5, 1, 0.5 or 0.1 percent of the property or characteristic, compared to a given standard.

The term "exemplary" is used herein to mean "serving as an example, instance or illustration". Any embodiment described as "exemplary" is not necessarily to be construed as preferred or advantageous over other embodiments and/or to exclude the incorporation of features from other embodiments.

The words "optionally" or "alternatively" are used herein to mean "is provided in some embodiments and not provided in other embodiments". Any particular embodiment of the invention may include a plurality of "optional" features unless such features conflict.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the terms "process" and "method" refer to manners, means, techniques and procedures for accomplishing a given task including, but not limited to, those manners, means, techniques and procedures either known to, or readily developed from known manners, means, techniques and procedures by practitioners of the chemical, material, mechanical, computational and digital arts.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental and/or calculated support in the following examples.

EXAMPLES

Reference is now made to the following examples, which together with the above descriptions illustrate some embodiments of the invention in a non-limiting fashion.

Example 1

A proof of concept of some embodiments of the present invention, the concept of a semipermeable hydrogel, which can exclude a polyelectrolyte molecule while exhibiting a greater affinity to water, has been tested. In this example, poly(N-isopropylacrylamide) (PNIPAM) based LCST hydrogel [Suk-kyun Ahn, et al., Stimuli-responsive polymer gels, Soft Matter, 2008, 4, pp. 1151-1157], known to exhibit LCST below 40° C., and an aqueous solution of poly (sodium 4-styrenesulfonate) (PSSS), serving as a polyelectrolyte, were examined for the ability of the hydrogel to exclude the polyelectrolyte on swelling into PSSS solution.

N-isopropyl acrylamide (NIPA, 97%), methylenebisacrylamide (MBA, 99%) as a crosslinker, ammonium persulfate (APS, 98%) as an initiator, N,N,N', N'-tetra-methyl-ethylene-diamine (TEMED, 99%) as an activator; poly(sodium 4-styrene-sulfonate) (PSSS, average Mw of about 1,000,000) as a polyelectrolyte, were all obtained at reagent grade from Sigma-Aldrich Israel, and were used as received, without any further purification.

Synthesis of PNIPA Hydrogel:

12 grams of NIPA and 2 g of MBA were dissolved in 120 mL of DI water followed by removing oxygen from the solution by nitrogen; the flask with solution was then closed with a lid and cooled down to 6° C. Thereafter, 7.2 ml of a freshly prepared 10% solution of APS and 173 µL of TEMED were added to the cold NIPA/MBA solution under steering; whereas the crosslinking level was assessed as described below The degree of crosslinking is typically expressed as n/m, a ratio between the number of monomer units (m) and the number of crosslinker units (n; crosslinking agent), participating in the polymerization process. This ratio is often expressed in %, while in some cases m is set to 1, and n is referred to as the crosslinking level.

In practice, the value n determines the 3D net pore/cell size of the hydrogel; on one hand, this suggests that the degree of crosslinking determines the pore/cell size; on the other hand, in the case of different synthesis conditions, the mix of X·m monomer moles and X·n crosslinker moles may result in different n and m values with the same n/m ratio. Also, in some cases the practical degree of crosslinking n/m is an average value since there is often no way to maintain constant m and n amounts throughout the polymerization process and along one polymer chain and across all 3D net.

In the case at hand 12 grams of NIPA=0.10608 moles and 2 grams of MBA=0.012744 moles, n/m=8.324, crosslinking degree=12%. The mixture was then evenly distributed in several polypropylene weighting dishes and placed into refrigerator at 6° C. for 24 hours. The resulting PNIPA gel pieces, having a crosslinking level of 12%, were cut into pillow-shape with average thickness 5 mm.

While estimating the crosslinking level based on the n/m ratio may be simple, the most effective way to assess the efficacy of the preparation as an insoluble draw agent is to test its capacity to filter-out the soluble draw agent by a simple soaking assays, as described below.

After preparation, the hydrogel pieces were conditioned by heating at 70° C. for 4 hours, and the exuded liquid was decanted and the dehydrated hydrogel pieces were immersed into DI water for 24 hours. Thereafter the hydrated hydrogel pieces were dehydrated again for 4 hours at 70° C. The dehydrated hydrogel pieces were weighted on dehydration; the exuded liquid was collected into polypropylene pans, weighted and evaporated in the vacuum oven overnight at 80° C.

The hydrogel capacity was 2.1 g (±6%) of water per 1 g of the hydrogel against fresh water absorption; Total dissolved solids (TDS) of the exuded liquid was less than 20 ppm (below detection limit), so it was essentially pure water, and the hydrogel was practically fully connected and did not contain non-bonded polymer chains. After conditioning the hydrogel pieces were stored in DI water.

Polyelectrolyte Solution Preparation:

120 grams of poly(sodium 4-styrenesulfonate) (PSSS) was dissolved in 1 liter of DI water at room temperature on magnetic stirrer for two hours, followed by 5 minutes of ultrasonic bath mixing. The resulting transparent solution was diluted with DI water so that to obtain 18 g/l PSSS solution. Since the molecular weight of PSSS backbone is very high (about 10E6 D), practically only Na+ ions exert the osmotic pressure; the PSSS monomeric unit weights 208 D, so the osmotic pressure of this solution may be estimated as $\pi = C \times RT = 2.11$ atm, were T=298° K, C=(18 g/l)/208 M, and R=0.08206 (l·atm)/(mole·K). This osmotic pressure is close to osmotic pressure of 3 g/l NaCl solution.

Water/PSSS Solution Separation by the PNIPA LCST Hydrogel:

Several pieces of the conditioned PNIPA hydrogel were dehydrated at 70° C. for four hours, then cooled to room temperature and immersed into 0.5 liter of the PSSS solution for 24 hours, followed by solution decanting. Thereafter the hydrated hydrogel pieces were weighted and heated in a closed jar to 70° C. for four hours. The exuded liquid was decanted and collected, and the dehydrated hydrogel pieces were weighted. The collected liquid was then deposited into the polypropylene pans and placed into a vacuum oven overnight at 80° C.

Analysis of the results show that the hydrogel absorbed less liquid from PSSS solution than from DI water, specifically, about 1.25 g±10% of liquid per 1 g of dehydrated hydrogel (versus 2.1 g±6% of water per 1 g of dehydrated hydrogel for DI water).

The TDS of the exuded liquid was 0.65 g/l. To understand the origin of the dissolved solids, the PSSS-swelled hydrogel samples was briskly rinsed for 30 seconds with DI water after liquid decanting, the rinsing water was collected in a polypropylene pan and evaporated in a vacuum oven. The amount of solid in the flushing water was very close to the amount of solid in the exuded on heating liquid (within the accuracy of the measurements, ±10%). This result suggests that TDS of the liquid exuded from the LCST hydrogel after PSSS solution processing originates from the solution leftovers, which stick to the sides and walls of the processing jar and the hydrogel surface, and that PSSS molecules are completely excluded from the hydrogel's interior (bulk volume).

It is noted that 70° C. is a typical temperature of waste heat for many industrial processes (heat engines and turbines cooling, etc.); it is also a temperature easily achievable by simple solar heaters without expensive heliostats and/or concentrators.

This experiment is shown to demonstrate some embodiments of the present invention, in showing that the combination of a soluble draw agent, such as the exemplary PSSS, and an insoluble draw agent, such as the exemplary 12% crosslinked PNIPA LCST hydrogel, can be used successfully in a forward osmosis process that requires cheap energy and works at ambient pressure, in order to desalinate, for example, sea water.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A process for water purification, comprising:
   i) drawing water by osmosis through a semipermeable membrane from a feed solution of an undesired solute to a draw solution that comprises a soluble draw agent at a first concentration of said soluble draw agent, thereby obtaining a solution that comprises said soluble draw agent at a second concentration, said first concentration is greater than said second concentration;
   ii) contacting said solution having said second concentration of said soluble draw agent with a dehydrated insoluble draw agent, thereby obtaining a hydrated insoluble draw agent in said solution and regenerating said solution having said first concentration of said soluble draw agent;
   iii) separating said hydrated insoluble draw agent from said solution;
   iv) exerting a stimulus on said hydrated insoluble draw agent thereby extracting water therefrom and regenerating said dehydrated insoluble draw agent.

2. The process of claim 1, further comprising repeating steps i-iv.

3. The process of claim 1, wherein said semipermeable membrane is impermeable to said undesired solute and to said soluble draw agent.

4. The process of claim 1, wherein an osmotic pressure of said insoluble draw agent is greater than an osmotic pressure of said soluble draw agent.

5. The process of claim 1, wherein said insoluble draw agent is substantially impermeable to said soluble draw agent.

6. The process of claim 1, said stimulus is selected from the group consisting of heat, compression, pressure, irradiation, electric field and magnetism.

7. The process of claim 1, wherein said stimulus is heat, and said insoluble draw agent is a temperature-responsive hydrogel.

8. The process of claim 6, wherein said temperature-responsive hydrogel comprises a crosslinked temperature-responsive polymer, and is characterized by a critical solution temperature lower (LCST) than 100° C.

9. The process of claim 8, wherein an average cell/pore size of said crosslinked temperature-responsive polymer, or said crosslinked pressure-sensitive polymer, is smaller than an average molecular size of said soluble draw agent.

10. The process of claim 8, wherein said contacting comprises soaking a dehydrated form of said temperature-responsive hydrogel with said solution of said soluble draw agent at a temperature below said LCST to thereby obtain a hydrated form of said temperature-responsive hydrogel.

11. The process of claim 10, wherein said exerting comprises heating said hydrated form of said temperature-responsive hydrogel to a temperature above said LCST thereby extracting said water and regenerating said dehydrated form of said temperature-responsive hydrogel.

12. The process of claim 1, wherein said stimulus is compression, and said insoluble draw agent is a pressure-sensitive hydrogel.

13. The process of claim 12, wherein said contacting comprises dipping a dehydrated form of said pressure-sensitive hydrogel in said diluted draw solution, thereby obtaining a hydrated form of said pressure-sensitive hydrogel.

14. The process of claim 13, wherein said exerting comprises compressing said hydrated form of said pressure-sensitive hydrogel, thereby extracting said water and regenerating said dehydrated form of said pressure-sensitive hydrogel.

15. The process of claim 1, wherein said insoluble draw agent is in a form of a plurality of objects or a monolithic object.

16. The process of claim 15, wherein said objects have a shape selected from the group consisting of a globular particle, a particle cluster, a rod, a cylinder, a platelet, a tube, a sheet and a box.

17. The process of claim 16, wherein said objects have an average size that ranges from 0.1 mm to 10 cm.

18. The process of claim 15, wherein said object has a shape selected from the group consisting of a sheet, an open-cell sponge and a tube.

19. The process of claim 1, wherein said soluble draw agent is a water-soluble polyelectrolyte.

20. The process of claim 19, wherein said polyelectrolyte molecule is selected from the group consisting of an anionic polyelectrolyte, a cationic polyelectrolyte, a nonionic polyelectrolyte, and any combination or copolymer thereof.

21. An apparatus for water purification by forward osmosis, comprising:
   a solution of a soluble draw agent;
   an insoluble draw agent in contact with said solution of said soluble draw agent;
   a semipermeable membrane that allows water to pass therethrough from a feed solution that comprises an undesired solute, to said solution of said soluble draw agent;
   means for temporarily separating said insoluble draw agent from said solution of said soluble draw agent; and
   means for exposing said insoluble draw agent to a stimulus when separated from said solution of said soluble draw agent,
   wherein:
   said soluble draw agent is having an osmotic pressure greater that an osmotic pressure of said feed solution;
   an osmotic pressure of a dehydrated form of said insoluble draw agent is greater than an osmotic pressure of said solution of said soluble draw agent;
   said insoluble draw agent is impermeable to said soluble draw agent; and
   a hydrated form of said insoluble draw agent is responsive or sensitive to said stimulus, such that when said hydrated form is separated from said soluble draw agent and exposed to said stimulus, water is extracted therefrom.

22. The apparatus of claim 21, comprising a forward osmosis unit (FU) and a separation unit (SU) in circular flow communication configured to circulate said solution of said soluble draw agent, and said SU comprises said insoluble draw agent and said means for temporarily separating said insoluble draw agent from said solution of said soluble draw agent.

23. The apparatus of claim 21, wherein said SU comprises said means for exposing said insoluble draw agent to said stimulus.

24. The apparatus of claim 21, wherein said insoluble draw agent and said semipermeable membrane are substantially not in direct contact therebetween.

\* \* \* \* \*